June 9, 1925.  1,541,331
F. DE SANTIS
AUTOMOBILE BUMPER
Filed July 2, 1924
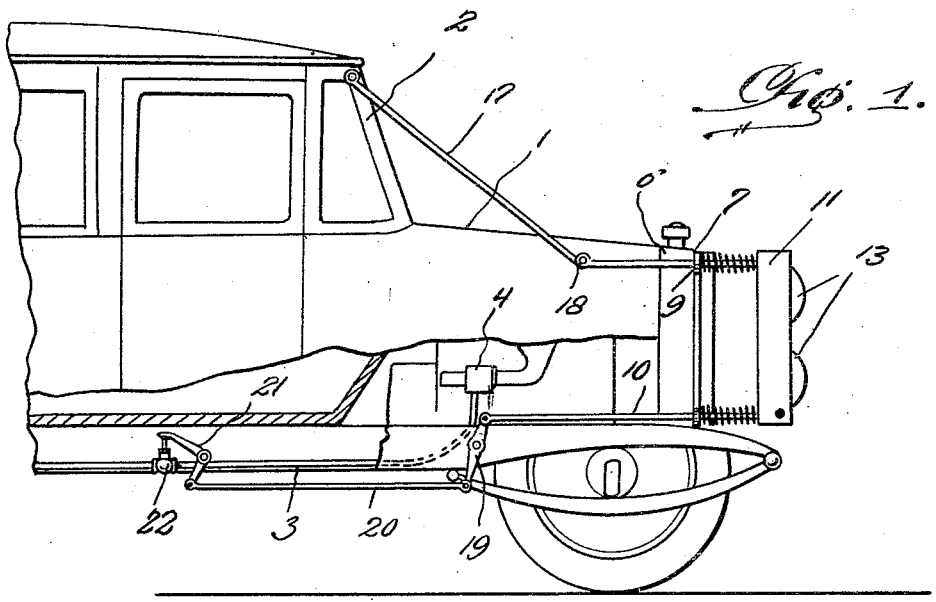
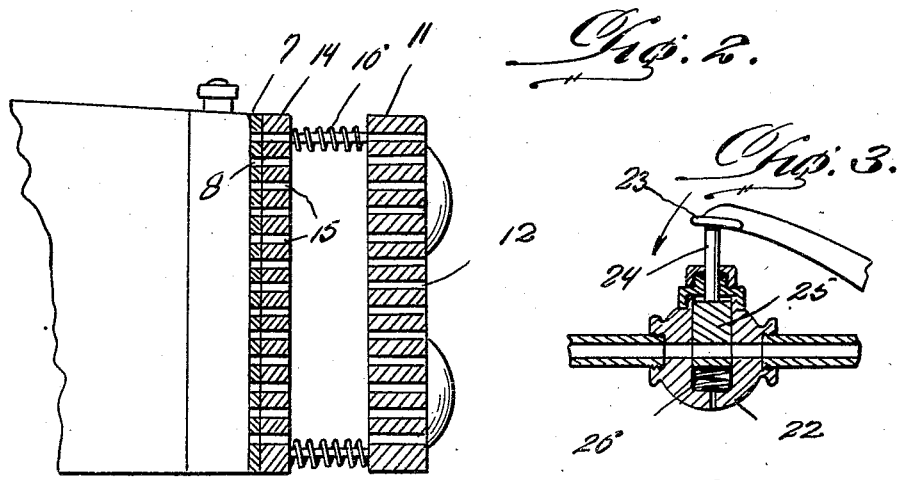
F. DeSantis,
Inventor
By Clarence A. O'Brien
Attorney Patented June 9, 1925.

1,541,331

UNITED STATES PATENT OFFICE.

FERDINANDO DE SANTIS, OF FRAMINGHAM, MASSACHUSETTS.

AUTOMOBILE BUMPER.

Application filed July 2, 1924. Serial No. 723,765.

*To all whom it may concern:*

Be it known that I, FERDINANDO DE SANTIS, a subject of the King of Italy, residing at Framingham, in the county of Middlesex and State of Massachusetts, have invented certain new and useful Improvements in Automobile Bumpers, of which the following is a specification.

This invention relates to automobile bumpers, and particularly to a bumper having means connected therewith for stopping the automobile engine upon striking an object.

An object of the invention resides in providing a cushion bumper for automobiles, mounted in front of the radiator, in spaced relation on slidable rod members carried by a plate member, secured to the radiator and adjacent parts of the automobile, means being interposed between the plates and the cushion bumper, for normally holding said bumper in projected position in front of said radiator, and a connection being provided between said cushion bumper and a suitable cut off valve in the gasoline feed pipe of the automobile, operable upon the bumper striking an object for cutting off the supply to an engine.

Another object of the invention resides in providing a relatively thick cushion bumper, mounted in spaced relation, in front of the radiator of an automobile, on suitable rod members slidably mounted in the plate member, secured to the front of the automobile, and provided with a cushion for receiving said bumper, said rods being provided with connections normally holding the bumper projected forwardly of the plate, and a connection being provided for operation by the plunger to cut off the gasoline supply to the engine, upon the striking of an object by the bumper.

The invention comprehends other objects and improvements in the details of construction and arrangement of the parts, which are more particularly pointed out in the following description and claims, directed to a preferred form of the invention, it being understood, however, that various changes in the form and construction of the parts may be made, without departing from the spirit and scope of the invention.

In the drawing, forming a part of this application:

Figure 1 is a side elevation of an automobile, equipped with the invention, portions thereof being shown in section.

Figure 2 is a view of the front portion of the automobile, showing the manner of mounting the cushion bumper in front of the radiator.

Figure 3 is a detail sectional view of the cut off valve, in the gas feed line to the carburetor.

The automobile is indicated generally at 1, which is provided with a windshield 2, of suitable form, and a gasoline feed pipe 3, from a source of gasoline supply to the carburetor indicated generally at 4, to be supplied to the internal combustion engine. The radiator of the automobile is indicated at 6, the front portion of which is secured has a plate secured thereon of steel or other metal, having a plurality of openings 8, adapted to permit the circulation of air through the radiator, in the usual and well known manner, said plate being secured to the front of the radiator by bolts or other means, in any desirable manner. The corner portions of the plates are provided with ears 9, suitably apertured for slidably receiving rods 10, at the corners of said plates, which mount at the forward ends thereof, a cushion bumper 11, substantially of thick resilient material, such as rubber or the like. The cushion bumper 11 is formed with a plurality of openings 12, adapted to permit the passage of air to the radiator, in order that the same may be properly cooled, while the corner portions of said cushion bumpers 11, are provided with parts of spherical projections 13, adapted to primarily engage an object against which it is directed. A cushion plate member 14 is mounted on the forward face of the plate 7, and is of relatively thin cushion material, such as rubber or the like, and provided with a plurality of openings 15, arranged in aligned relation, with the openings 8, in the plate 7. Suitable coil springs are mounted around the rods 10, as indicated at 16, between the cushion plates 14 and the cushion bumper 11, for normally maintaining said bumper in spaced projected position, in front of the radiator. The rear ends of the rods 10, mounting the upper ends of the bumper, are connected with the windshield 2, by suitable connecting rod 17, the connection 18 between said rods 10 and 17, being adapted for readily breaking or shearing, upon engagement of the bumper with an object, for a purpose which will readily appear. One of the rods 10, mounting the lower end of the bumper, extends rearwardly of said radiator for connection with a lever 19 pivotally mounted on the frame bar of the automobile intermediate the ends, while the other end of said lever is connected by a rod 20, with a bell crank lever 21, adapted to operate the cut-off valve, indicated at 22. The free arm of the bell crank lever 21, is provided with an enlarged flat finger 23, engaging the stem 24, carried by the slidable valve member 25, in the body of the valve 22, which is provided with an opening for controlling the passage of gasoline through the fuel supply pipe 3, in a manner which is clearly shown in Figure 3 of the drawing. A spring 26 normally tends to hold the valve 25 in position to permit the passage of fuel to the carburetor in a manner indicated in Figure 3.

From the foregoing description, it will be seen that relatively thick cushion bumper 11, projecting in spaced relation forwardly of the radiator of the automobile, upon striking of an object will be forced rearwardly, compressing the spring 16, and operating the rods 10, at the upper ends thereof for steering the connections 18, and the rods 10 at the lower end thereof connected with the lever 19 for cutting off the supply of fuel, to the carburetor 4, said cushion member engaging the plate 14 of cushion material, and absorbing the entire shock imparted thereto, by the striking action of the object, due to collision or other unavoidable means.

In practice, the cushion bumper 11 is provided with relatively thick rubber, which will absorb tremendous jars ,and shocks without imparting undue strain upon the radiators and the automobile.

It will be apparent from the above description that a novel form of bumper has been provided for cushioning the automobile, in striking an object, and for cutting off the gasoline supply to the engine thereof, to prevent damage which otherwise occur.

What is claimed is:

1. A bumper for automobiles, comprising a perforated plate mounted on the front of the radiator of the automobile, a relatively thick cushion bumper, a plurality of rods projecting rearwardly from said bumper and slidably mounted in said plate, means for normally retaining said bumper in projected relation in front of said plate, a cut-off valve, in the fuel feed pipe of said automobile, and connections between said bumper and cut-off valve, operable for shutting off the flow of fuel in said pipe, upon the movement of said bumper member, toward said plate.

2. A bumper of the class described, comprising a perforated plate mounted on the forward end of the radiator, a perforated cushion member mounted on the front face of said plate, a relatively thick cushion bumper provided with a plurality of perforations, a series of rods mounted on said bumper and slidably extending through said plates for mounting said bumper in spaced relation with said plate, rod members connecting predetermined of said supporting rods with the windshield of said automobile, said rod having pivotal connections with the supporting rod, a cut-off valve mounted in the fuel feed pipe of the automobile, a connection between the cut-off valve and said bumper, for operation to cut off the fuel supply through said pipe, upon a movement of the bumper toward said plate, and resilient means between the plate and the bumper for normally retaining the bumper in spaced relation to and in front of said plate.

In testimony whereof I affix my signature.

FERDINANDO DE SANTIS.